United States Patent [19]

Mester

[11] Patent Number: 4,791,499
[45] Date of Patent: Dec. 13, 1988

[54] METHOD AND APPARATUS FOR REPRODUCTION OF VIDEO SIGNALS FROM MAGNETIC TAPE AT A TAPE TRANSPORT SPEED DIFFERING FROM THAT OF RECORDING

[75] Inventor: Roland Mester, Darmstadt, Fed. Rep. of Germany

[73] Assignee: Robert Bosch GmbH, Stuttgart, Fed. Rep. of Germany

[21] Appl. No.: 936,827

[22] Filed: Dec. 2, 1986

[30] Foreign Application Priority Data

Dec. 10, 1985 [DE] Fed. Rep. of Germany ....... 3543540

[51] Int. Cl.⁴ .......................................... H04N 5/783
[52] U.S. Cl. .................................. 360/10.3; 360/33.1; 358/335
[58] Field of Search .................... 360/10.1, 10.3, 33.1, 360/32, 66, 9.1; 358/335, 310, 312; 365/218

[56] References Cited

U.S. PATENT DOCUMENTS

4,279,024 7/1981 Schrenk .............................. 365/218
4,597,020 6/1986 Wilkinson ............................ 360/32

*Primary Examiner*—Alan Faber
*Attorney, Agent, or Firm*—Frishauf, Holtz, Goodman & Woodward

[57] ABSTRACT

In a magnetic tape machine which can be played to reproduce television pictures at speeds different from the recording speed, in connection with which the video signals are stored in a picture memory, the video signals are stored under group addresses in 60-byte blocks, both for the luminance and chrominance signals. After a predetermined storage period has elapsed, the stored data are overwritten with erasing value signals. A circuit arrangement for this operation includes an administrative memory (4) for which the storage duration values for contents stored under every block address is, beginning after writing-in, successively reduced in value. When a zero value is reached, the corresponding block address is stored and used in its turn as a write-in address for the erasing value signals which replace the video data previously written in to the picture memory under this address. The erasing orders are preferably accumulated in a buffer and then executed while no usable signals for storage in the memory are being picked up (i.e. when the tape scanning is passing over boundary areas between adjacent tracks).

8 Claims, 1 Drawing Sheet

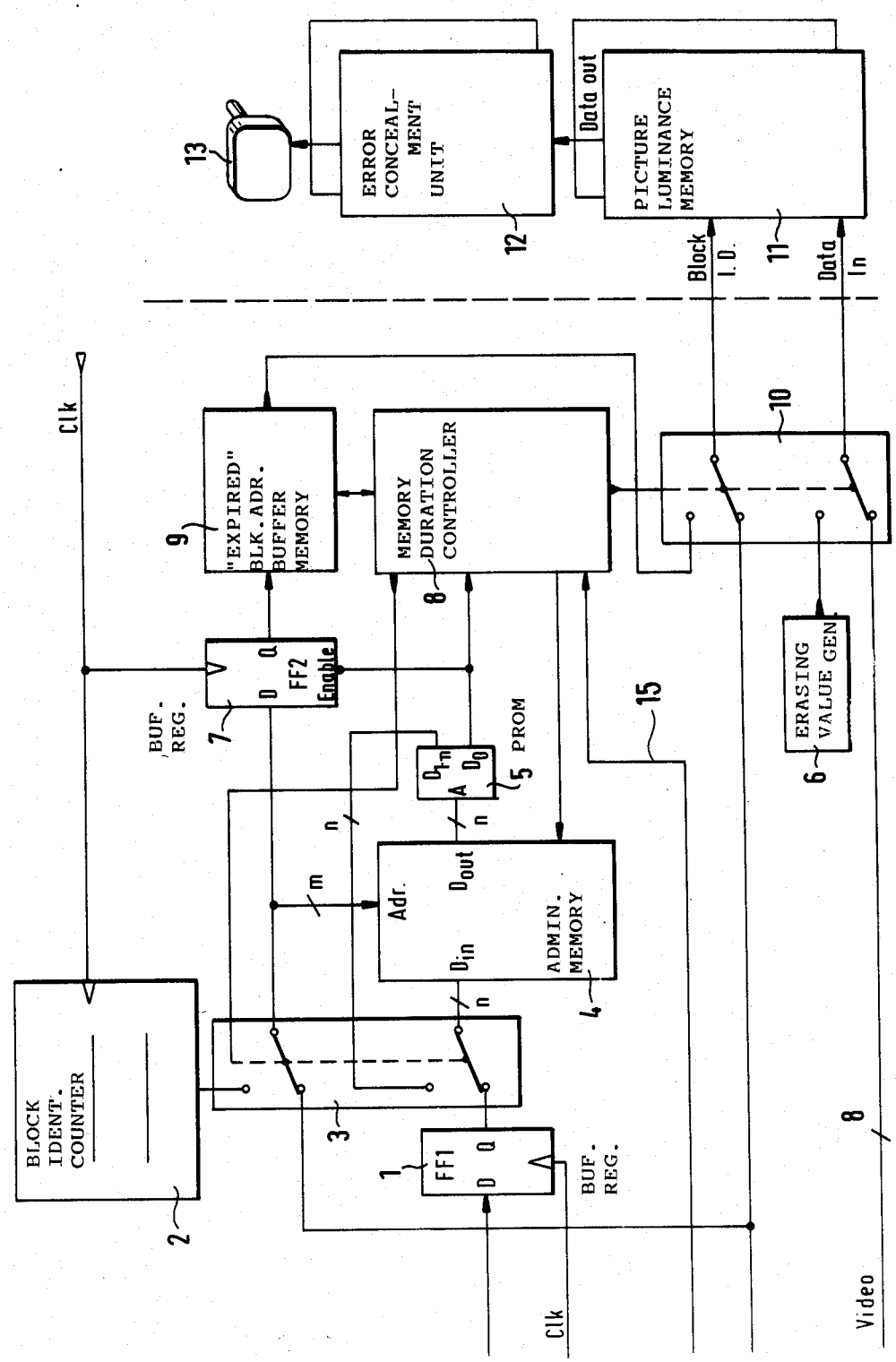

METHOD AND APPARATUS FOR REPRODUCTION OF VIDEO SIGNALS FROM MAGNETIC TAPE AT A TAPE TRANSPORT SPEED DIFFERING FROM THAT OF RECORDING

The invention relates to reproduction of video signals from magnetic tape at a rate faster or slower than that of recording.

U.S. Pat. No. 4,139,867 shows a method for reproducing video signals recorded on a record medium in individual tracks, which method permits both slow-motion and accelerated-motion reproduction. In this case, the magnetic head is mounted on the periphery of a head wheel which scans the tape in paths which lie at an angle to the recorded tracks which depends upon the selected playback speed and of course run across the recorded tracks in so doing. Track sections that are good enough to store in terms of satisfying prescribed requirements are written into an intermediate memory and are read out to put together out of these track sections a complete television picture corresponding to a television transmission standard.

For successive writing in of the video signals into an intermediate memory and reading out therefrom in accordance with television standards, addressing is necessary. This addressing can be carried out linewise or also blockwise, and the addresses can be either presumed to be already known as in the case of U.S. Pat. No. 4,139,867 or already recorded along with the video information on the tape, or else can be derived during reproduction from machine - specific data. Methods for obtaining the memory addresses are found for example in U.S. Pat. Nos. 4,210,938 and 4,293,879.

The known methods provide for reproduction of the video signals recorded on the magnetic tape at normal speed, in principle, with every possible slowing or acceleration of the transport speed, but, on the other hand, the feature composition, particularly in accelerated (time-shortening) reproduction, in general runs irregularly because of the use of memories or infinite integration time, i.e. certains parts are replaced by current video data only after relatively long time intervals. The over-aged video data produce a torn-up picture impression.

For avoiding these undesired effects, it is indeed conceivable that the entire content of the intermediate memory could be erased at constant intervals, but in that case current video data would also be fully erased, for which a substitute follows in the following interval only after a considerable time. The picture impression is then determined to a great extent by the missing video data. Measures for concealing the missing video data could indeed moderate these effects on the reproduced television picture, but the fact remains that in this system unnecessarily erased current data must in this case be only imperfectly replaced.

SUMMARY OF THE INVENTION

It is an object of the invention to provide picture reproduction at selectable speed in a manner in which old unrefreshed picture data do not remain preserved unduly long in intermediate memories and in which no movement phases in the picture are torn apart.

Briefly, the maximum storage time of picture information in the picture memory is made a function of the tape transport speed. It is furthermore desirable to put the picture information together in groups or blocks and to assign an age designation to each group or block. It is then desirable also to erase groups or blocks of picture information in the picture memory as soon as the described memory preservation time for the particular group or block has expired. The erasing is preferably by writing "erasing information" on top of the group of picture information to be erased in the picture memory.

It is also desirable to do the erasing in the picture memory in those intervals during which no useful picture information can be taken from the magnetic tape.

Further details of the invention will be explained in the description that follows.

BRIEF DESCRIPTION OF THE DRAWING

The invention is further described by way of illustrative example with reference to the annexed drawing in the single FIGURE of which an illustrative embodiment of the invention is shown by way of a circuit block diagram of a circuit for variable determination of the maximum dwell time of the video data in the intermediate memory and of the necessary memory control for the removal of these over-aged data from the memory.

DESCRIPTION OF THE ILLUSTRATED EMBODIMENT

The drawing shows a picture memory 11 for storing the luminance value of a color television signal to which the video signals are supplied in digitized form, for example as words eight bits wide, over the change-over switch 10 by way of which they reach the data input of the picture memory 11. In the picture memory 11, the number of values that are stored is sufficient either for a full frame of a picture or just for one field of a picture. For reasons that will presently appear, the picture memory is more aptly designatable as a "replenishment store".

For purposes of search operation of the tape machine, the video data are subdivided into blocks of, for example, 60 bytes which are collectively protected from errors and are accompanied by a block identification signal. These block identification signals are supplied to a second input of the picture memory 11 and determine the addresses under which the block in question will be deposited in the picture memory.

The block identification signals simultaneously go to a register 7 through a second change-over switch 3 and also to the address input of a control or administrative memory 4. The register 7 consists, for example, of 14 flipflops. The administrative memory 4 has just one storage place corresponding to each block of a frame. Assuming now that the picture memory 11 is a full-frame memory and that each of the blocks are composed of 60 bytes, fewer than 16K words need to be administered in the administration memory 4.

The greatest permissible age for video information in the picture memory 11 is determined by, among other things, the factor by which the reproduction speed is raised compared to the tape speed at the time of recording. Thus according to the particularly selected search operation speed, which would be the fastest operating speed, a data word is put into a register 1 that likewise can consist of many parallel flipflops, at the D input of the register which is allocated for the largest possible age value. This data word is supplied to the D input of the administrative memory 4 through a transfer contact of the change-over switch 3.

A programmable read-only memory 5 is connected to the output of the administrative memory 4 and has an output $D_{1...n}$ that is connected with the second contact of the change-over switch 3, so that in switching over of that switch from the output of the register 1 to the second contact, the output of the programmable read-only memory (PROM) 5 is connected with the input of the administrative memory 4.

At the time the maximum storage time in the memory is thus selected, a counting pulse rate is prescribed at the same time that the search operation speed is set. The counting pulses operate on the counting input of the block address counter 2. The output of the block address counter 2 is connected to the second input of the second change-over switch in the multiple change-over switch 3. The counting pulses just mentioned also proceed to the clock input of a second register 7, the input of which is connected with the address input of the administrative memory 4. The register 7 has an output connected with the input of a buffer memory 9. The buffer memory 9 can be of the first-in first-out (FIFO) type. The output of the buffer memory 9 is applied to an input of the multiple change-over switch 10, the other change-over switch of which selectively switches between video data and an erasing value generator 6.

Switching over is performed under control of the memory duration controller 8 which from another of its outputs also affects the multiple change-over switch 3. The memory duration controller 8, which can be called a "persistance controller" for short, also controls the manner of operation of the administrative memory 4 as will be further explained below. The E (enable) input of the register 7 is affected by the null output of the PROM 5 and likewise the memory duration controller 8.

The manner of operation of the above-described system during reproduction at a tape transport speed deviating from the recording tape transport speed can be described as follows: The video data are written into the picture memory 11 while the block identification signals which are written into the address input of the picture memory 11 represent the addresses. The stored data are read out of the picture memory 11 and are supplied, with interposition of an error concealment apparatus 12, to the picture display apparatus 13.

The memory duration controller 8 recognizes when it must deal with a new block identification, on the basis of the regularities existing at various reproduction speeds. Corresponding thereto, the change-over switch 3 is so switched (i.e. to its lower position in the drawing) at the appearance of a block identification that the latter is guided to the address input of the administrative memory 4. At the same time, the memory duration value for this particular block identification is put into the administrative memory and has a value corresponding to the particular reproduction speed. During the remaining time in which no new block identification appears, the change-over switch 3 is so switched (i.e. to its upper position in the drawing) that the output of the block identification counter 2 is connected to the address input of the administrative memory 4 and at the same time the output $D_{1...n}$ of the PROM 5 is connected with the D input of the administrative memory 4.

With a certain pulse rate determined by the search operation speed, the block identification addresses contained in the administrative memory 4 are counted through by the block identification counter 2 during the time in which the switch 3 remains in its upper position and at the same time the particular addresses are supplied to the address input of the administrative memory 4. With each arriving address at the address input of the administrative memory 4, the corresponding current memory duration value present in the administrative memory 4 is put into the PROM 5 and reduced in value by 1. This value lowered by 1 is put anew into the administrative memory 4 from the output $D_{1...n}$.

If the value stored in the administrative memory 4 for a certain block identification address is still only equal to 1 and if this value is set to a value equal to 0 upon renewed downcounting in the PROM 5, there appears at the output $D_O$ a signal designating that the picture content stored under the particular block identification address no longer needs to be stored.

An activation signal is then given to the E input of the register 7 and the block identification address contained at this moment in the block identification counter 2 is taken over into the register 7. The content of the register 7 is thereafter transferred by the memory duration controller 8 into the buffer memory 9. In the buffer memory 9 there are stored in timewise succession the block identification addresses of which the storage time has run out, so that the corresponding picture content should be erased in the picture memory.

The memory duration controller 8 receives information over a conductor 15 whenever interruption occurs in the block identification address rhythm. Such interruptions can arise, for example, when the magnetic heads on the head wheel, in search operation, cross tracks and as a result receive no decodable signals. In these time regions the change-over switch 10 is switched over so that the output of the buffer memory 9 is connected with the block identification input of the picture memory 11 and the output of the erasing value generator 6 is connected with the data input of the picture memory 11. The block identification addresses called out of the buffer memory 9 have the effect that in the picture memory 11 new data are written under the particular addresses, which data however come from the erasing value generator 6 and therefore do not represent any picture content. In consequence, the picture content up to then stored under these particular block identification address appears to be erased.

The picture memory 11 and the error concealment apparatus 12 are constituted in at least two planes or levels so that corresponding control can readily be provided for the luminance signals and for the chrominance signals. These may be correspondingly stored at the same time and erased after running of the prescribed storage time.

It is highly convenient to provide a running measure of the picture quality based on the number blocks of picture information that are erased per units of time.

It is also convenient as a manner of construction to utilize a common bus for the picture information data and the erasing values that are to be written into the picture information memory and, of course, to write the erasing value signals into the picture memory in designated blocks corresponding to the picture information data to be erased.

Although the invention has been described with reference to a particular illustrative example, it will be understood that modifications and variations are possible within the inventive concept.

What is claimed is:

1. Method of reproducing video signals stored on a magnetic tape at a speed differing from the recording speed with the use of picture memory means for storing picture information, said method comprising the steps of:

determining a maximum storage duration of the picture information in said picture memory means as a function of the tape transport speed to be used in reproduction;

subdividing the picture information of groups of substantially equal size and assigning an age designation to each group, and erasing each said group of picture information in said picture memory as soon as the predetermined storage duration for the particular group has elapsed.

2. Method according to claim 1, wherein the erasing step is performed by overwriting a group of picture information to be erased in the picture memory with erasing information.

3. Method according to claim 2, wherein the step of overwriting picture information in the picture memory with erasing information is performed in time intervals in which no useful picture information is currently available from the magnetic tape.

4. Method according to claim 2, in which a measure is determined for the picture quality from the number of groups of picture information that are erased in a unit of time.

5. Method according to claim 2, in which picture information data and erasing value utilize a common bus for writing into the picture memory and the erasing values are written into the picture memory in the memory portion corresponding to the picture information being erased.

6. Method according to claim 1, in which luminance and chrominance signals are stored separately in said picture memory and the luminance and chrominance signals of the same group are assigned the same maximum storage duration in the picture memory.

7. Apparatus for controlling reproduction of video signals from a magnetic tape at a tape transport speed different from the recording speed, comprising:

a picture memory with a capacity of at least one picture field for storage of picture information;

an administrative memory (4) for storing age information of respective blocks of picture information stored in said picture memory and having storage locations corresponding to addresses to said respective blocks, said administrative memory also having means (5) for decrementing the content of any said storage location when said location is addressed;

a block identification counter (2) for counting through the block addresses of the administrative memory (4);

a memory duration controller (8) for controlling the block identification counter (2) and said administrative memory (4), said controller including means for supplying an age limit word to said administrative memory for each new block identification accompanying said blocks of picture information, means for activating said counter after receiving each new block identification and causing it thereafter to successively address the locations of said administrative memory and connect the decremented content values of said locations for replacement of the previous contents, and means for recognizing interruptions of the rhythm of succession of block identifications;

a buffer memory (9) having an input register (7) responsive to zero content location outputs of said administrative memory for being loaded with the corresponding location addresses, for storage of successive identifications of the block addresses for which the storage time has been counted out to a said zero content output in said administrative memory (4), said buffer memory (9) being connected for loading from its said input register under control of said memory duration controller;

an erasing value signal generator (6) for blockwise generation of erasing value signals and overwriting in the picture memory of picture information belonging to block addresses stored in said buffer memory (9), and said memory duration controller (8) also having means responsive to recognition of said rhythm interruption for controlling the transmission path (10) of said erasing value generator (6) to said picture memory (11).

8. Apparatus according to claim 7, wherein said buffer memory is a first-in-first-out (FIFO) memory for limiting the storage time therein.

* * * * *